Nov. 13, 1956 D. SILVERMAN 2,770,312
SEISMIC WAVE GENERATION
Filed Sept. 11, 1953 2 Sheets-Sheet 1
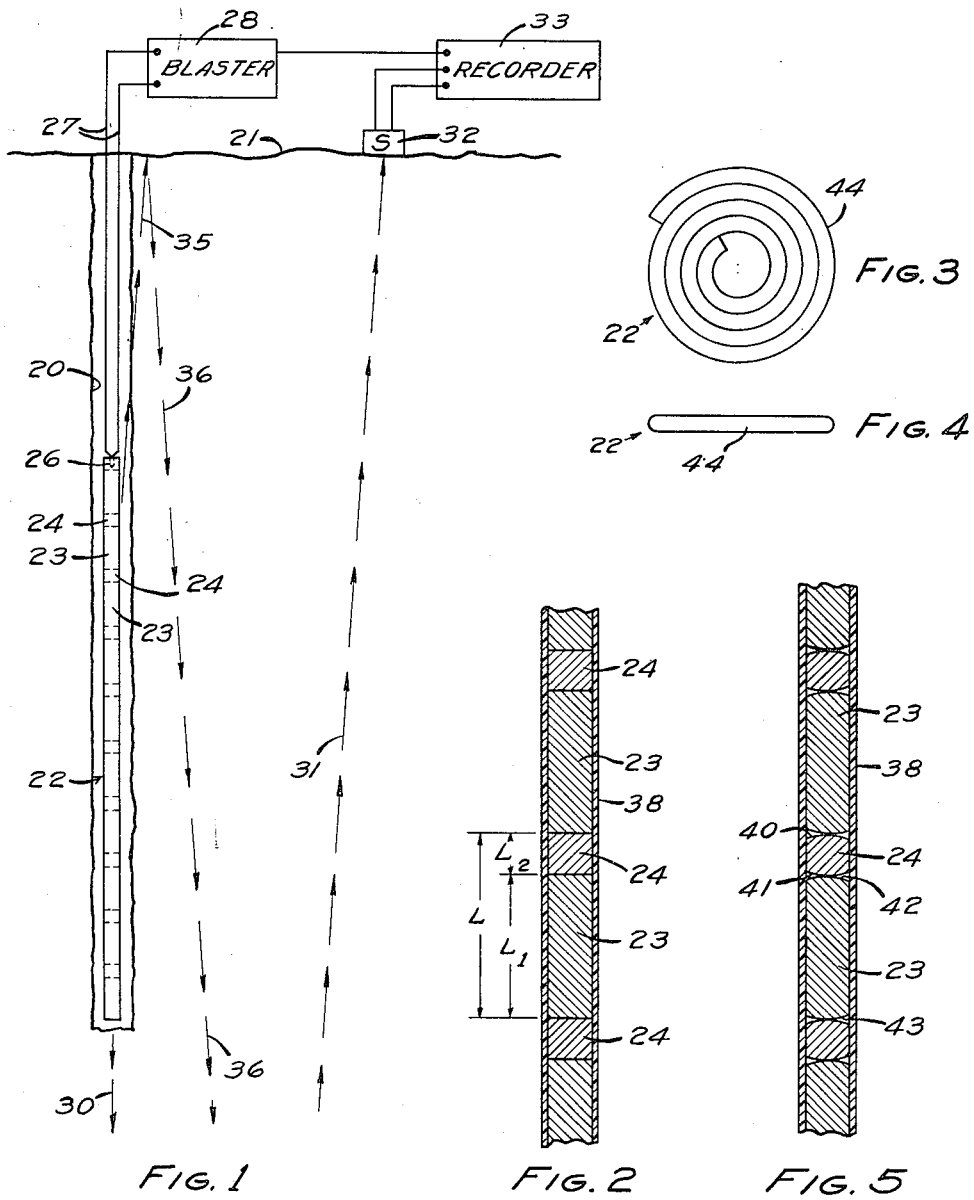
INVENTOR:
DANIEL SILVERMAN
BY Newell Pottor
ATTORNEY

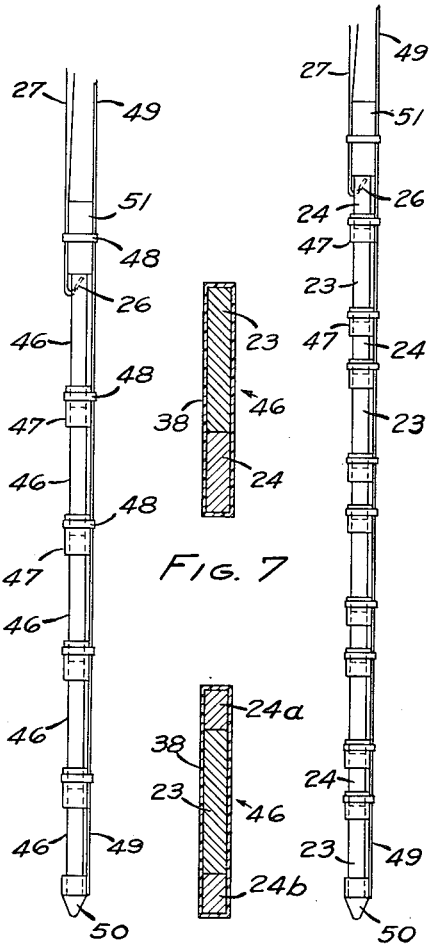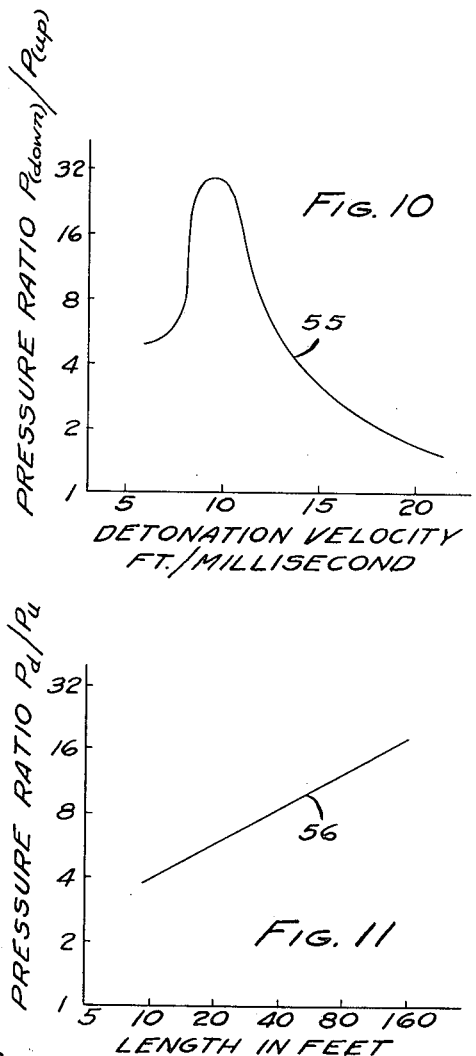
Fig. 6  Fig. 8  Fig. 9
Fig. 7
Fig. 10
Fig. 11

United States Patent Office 2,770,312
Patented Nov. 13, 1956

2,770,312

SEISMIC WAVE GENERATION

Daniel Silverman, Tulsa, Okla., assignor to Stanolind Oil and Gas Company, Tulsa, Okla., a corporation of Delaware Application September 11, 1953, Serial No. 379,594

5 Claims. (Cl. 181—.5)

This invention relates to seismic geophysical surveying and is directed to improvements in the generation of seismic waves. Specifically, the invention is directed to an improved method and apparatus for providing continuous, distributed charges of explosive having a detonation velocity substantially matching the seismic-wave propagation velocity in a surrounding medium.

Experiments carried out under carefully controlled conditions have now demonstrated that, in some locations during ordinary seismic geophysical surveying, there may occur and be recognized on the seismic records two distinct kinds of reflections which, for convenience, will be referred to herein as "primary" and "secondary" reflections. Ordinarily the primary reflections are the only ones it is desired to observe, and these are produced when the downwardly traveling seismic-wave energy from an explosive charge encounters a subsurface reflecting interface which returns part of it to the ground surface.

In many areas, however, secondary reflections also occur because the ordinary explosive charge radiates energy in all directions. Secondary reflections are those produced by energy which initially travels upwardly from the exploding charge and encounters a strongly-reflecting interface above the charge which directs most of this energy downwardly. Thereafter, it travels along almost the same reflection paths as the primary reflection energy, but it is received and recorded at a later time on the seismic records with an amplitude and character which are often very nearly the same as those of the primary reflections. Thus, in addition to making the seismic records more complex and difficult to interpret, strong secondary reflections may actually obscure and prevent observation of weak primary reflections from deeper horizons which may be more diagnostic of geological structure.

Experiments have also shown that, in an area where secondary reflections are troublesome, they can be substantially entirely eliminated by generating the seismic waves by means of a top-capped, elongated explosive charge having a detonation velocity closely matching the seismic-wave transmission velocity of the surrounding earth medium. In fact, it has been repeatedly observed that elongated, velocity-matching explosive charges detonated from the top down produce only primary reflections, while similar charges detonated from the bottom upward produce only secondary reflections.

This is believed due to the distribution of wave pressures around an elongated, velocity-matching explosive charge, which distribution is highly directional compared with the pressure field around a concentrated explosive charge of the same weight. Around a downwardly exploding charge 75 feet long, for example, a ratio of downward to upward pressures as high as 30 to 1 has been observed. It may be remarked, however, that the directional pressure effect noted is not so much an increase in the downward pressure as it is a decrease in the upward pressure, compared with the pressures surrounding a concentrated explosive charge of the same weight, which are assumed to be equal in both the up and down directions. The downward pressure of the elongated charge may increase by a factor of only two or three, whereas the upward pressure may decrease to one-tenth of its value for a concentrated charge.

Where the amount of explosive material required to generate the seismic waves is not large, a satisfactory elongated charge having a detonation velocity matching the seismic-wave transmission velocity of an earth or water medium can be provided by forming a cord or strand of high-velocity explosive material into a helix or similar form as taught in Silverman Patent 2,609,885. Thus, charges have frequently been constructed using as the explosive material one or two strands of Primacord wrapped about a reinforced, thick-walled rubber hose as the supporting structure. Such charges, however, require substantial lengths of time to prepare during field operations.

From the standpoint of speed of preparation and convenience in field operations therefore, it would be preferable to be able to employ a linear column of explosive which could be simply lowered into a bore hole without such additional manipulations as winding it on a form or otherwise forming it into a helix. A primary object of the present invention, therefore, is to provide such an explosive charge. Another object is to provide a novel and improved method and apparatus for generating seismic waves by the use of substantial weights of explosive material in an elongated vertical column. A further object is to provide a method and apparatus for constructing for seismic surveying an elongated explosive charge having a detonation velocity substantially matching a formation seismic wave transmission velocity. A still further object of the invention is to provide, for seismic geophysical surveying, an elongated explosive charge which utilizes a plurality of explosive compositions in ways both to match the seismic-wave velocity of the surrounding medium and to improve the detonation properties of the explosive materials. Still another object is to provide a way of safely preparing elongated seismic explosive charges in advance of the time of utilization, in a form suitable for convenient transportation. Another and still further object is to provide a novel and improved form of explosive stick for use in such elongated charges. Other and further objects, uses, and advantages of the invention will become apparent as the description proceeds.

In accordance with my invention, the foregoing and other objects are accomplished by utilizing two different explosive materials having two different detonation velocities. One has a detonation velocity less, while the other has a detonation velocity greater, than the seismic-wave propagation velocity of the surrounding medium. An elongated column of explosive of the desired length is then provided by utilizing short segments of each of the explosive materials alternately along the length of the column in such a way that the detonation travel time from end to end of the column is equal to the seismic-wave travel time through the formations immediately adjacent the charge in a bore hole.

In a preferred embodiment of my invention, the explosive column is formed of a plurality of exposive sticks placed end to end, each stick containing explosives of the two detonation velocities, that of the higher velocity being arranged at each of the two ends of the stick, and the central portion of the stick being composed of the low detonation velocity explosive. The presence of the high-velocity material at the ends of the stick insures proper transmission of the detonation from each stick to the next adjacent stick of the column, regardless of the presence of small gaps which could prevent detonation between two sticks of low-velocity material. Also, the presence of high-velocity material at a plurality of points along the length of a column of explosive is of assistance to guarantee that the low-velocity material detonates with a high-order detonation rather than by deflagration or burning.

This will be better understood by reference to the accompanying drawings forming a part of this application, in which drawings:

Figure 1 is a diagrammatic illustration of a seismic shot hole in cross-section, with an embodiment of the invention therein;

Figure 2 is a cross-section of a portion of the explosive charge of Figure 1;

Figures 3 and 4 are respectively plan and edge views of the explosive charge of Figure 1 as arranged for transportation;

Figure 5 is a cross-section view, similar to Figure 2, showing a modification of the invention;

Figure 6 is an elevation view of a preferred embodiment of the invention;

Figures 7 and 8 are cross-section views of alternative embodiments of the explosive stick units of Figure 6;

Figure 9 is a view, similar to Figure 6, showing a further embodiment of the invention;

Figure 10 is a graph of pressure conditions as a function of the matching of the charge-detonation and seismic-wave transmission velocities; and Figure 11 is a graph of the effect of charge length on certain pressure ratios observed around a detonated elongated charge.

Referring now to these drawings in detail and particularly to Figure 1, a seismic shot-hole 20 is shown as extending to a substantial depth from the ground surface 21. In shot-hole 20 is placed an elongated charge 22 which is made up of alternate lengths of two different explosive materials 23 and 24 and is provided at its top end with an electric detonator 26 connected by insulated leads 27 to a blaster 28 at the ground surface 21.

The earth materials surrounding bore hole 20 have a seismic-wave transmission velocity V for ordinary compressional seismic waves. When detonator 26 is detonated by the action of blaster 28, the detonation wave travels through the explosive materials 23 and 24 from the top end of charge 22 to the bottom. If the explosive material 23 has a velocity of detonation somewhat less than V, while the explosive material 24 has a detonation velocity somewhat greater than V, and if the relative lengths of the two explosive materials are properly chosen, the overall travel time of the detonation wave from end to end of charge 22 may be made, as nearly as desired, equal to the seismic-wave travel time through the adjacent earth medium at the velocity V.

Upon the detonation of such a charge 22, a seismic-wave front is ordinarily propagated downwardly along the path 30, to be reflected from one or more subsurface interfaces below the shot hole 20 and returned to the surface 21 by a path 31, where it is detected by a seismometer 32 connected to a recorder 33, which records the reflected wave impulses as a function of time in a manner well known in the art. Since each small portion of explosive in charge 22 tends to give off its energy in a radial direction, however, it may be observed that energy is also transmitted to the earth surrounding bore hole 20 in a direction to travel upwardly from the charge 22 along a path 35. It may then encounter a reflecting interface, which may in some cases be the ground surface 21 or, in other cases, the base of the so-called "weathered layer" or a similar interface. If this occurs, this energy may thereafter travel downwardly along a path 36, to be reflected by the subsurface interfaces and returned to the ground surface along the path 31. This is the path ordinarily followed by the secondary reflection impulses mentioned above.

As compared with a concentrated charge of the same weight of explosive, it is a property of the elongated charge 22 detonated from the top down, that the ratio of the primary reflection energy traveling along the path 30 to the secondary reflection energy traveling the path 35, 36 is so large as to make the secondary reflections negligible in amplitude. Similarly it has been observed that, if the charge 22 is detonated upwardly from the bottom by placing the detonator 26 at the lower end, the reflection-producing energy traveling along the path 30 is negligible compared to that transmitted along the path 35, 36. Concentrated charges do not produce troublesome secondary reflections in all areas, but where they do occur, the top-capped elongated charge is an effective remedy.

The manner of constructing the charge 22 is shown in greater detail in Figure 2. Thus, segments of low detonation velocity material 23 of length $L_1$ are placed between and in intimate contact with segments of high detonation velocity material 24 of length $L_2$, and the explosive column so formed is surrounded by a waterproof covering 38 of Vinylite plastic or the like, preferably of sufficient strength both to support the weight of the charge material and to withstand any hydrostatic pressures to which the charge is likely to be exposed in a shot hole. The charge 22 is thus formed of a plurality of units of length L, where L is the sum $L_1$ and $L_2$, and any number of such units may be employed to achieve any total length desired for the charge 22, since each unit individually matches the seismic-wave velocity. While there may be an optimum value for the unit length L, it does not appear to be especially critical, except that an upper limit of 5 to 10 feet should probably not be exceeded. Unit lengths from about 3 to about 30 inches appear to be satisfactory.

If V is the seismic-wave velocity it is desired to match, and $V_1$ and $V_2$ are the low and high detonation velocities, respectively, then the ratio of the length $L_1$ to the length $L_2$ is given by the expression $$\frac{L_1}{L_2}=\frac{V_1(V_2-V)}{V_2(V-V_1)} \qquad (1)$$

As examples of the application of this formula, there are commercially available, at present, explosives with detonation velocities lying in the range from about 7,500 to over 20,000 feet per second. In general, the higher-velocity compositions are somewhat more sensitive and detonate more reliably under bore-hole conditions than do the low-velocity materials, especially when the latter are elongated and of small cross-section. Nevertheless, these low-velocity materials are useful for velocity-matching purposes, especially when employed in the manner taught herein, with adequate waterproofing and with segments of the more sensitive high-velocity material interspersed in the explosive column to act in part as boosters. As an example, the following table illustrates the application of the above formula to two explosive materials of velocity respectively, 7,500 and 20,000 feet per second:

*Table I*

| V | Ratio $L_1/L_2$ | Ratio $L_1/L$ |
| --- | --- | --- |
| 7,500 | Inf. | 1.00 |
| 8,000 | 9.00 | .90 |
| 8,500 | 4.31 | .81 |
| 9,000 | 2.75 | .73 |
| 9,500 | 1.97 | .66 |
| 10,000 | 1.50 | .60 |
| 10,500 | 1.19 | .54 |
| 11,000 | .964 | .49 |
| 11,500 | .797 | .44 |
| 12,000 | .667 | .40 |

In this table the first column V is the seismic-wave velocity to be matched, the middle column is the ratio given by the above formula, while the third column is the ratio of length $L_1$ of the low-velocity material to the total unit length L. This column is thus the fraction of the total amount of material which is of low detonation velocity $V_1$. It will be understood that this table is presented only as an example and that, by employing Equation 1 above, similar tables can be prepared for other pairs of explosive compositions having different detonation velocities.

For convenience in transportation and handling, the charge 22 is preferably packaged in the form of a flat spiral 44, as shown in Figures 3 and 4, but any other form could, of course, be used if preferred. If the explosive materials 23 and 24 are too brittle for forming into the spiral 44, the individual segments are preferably formed with rounded ends as shown in Figure 5. Thus, the segment 24 is rounded as shown at the ends 40 and 41 while the segment 23 is similarly rounded as at ends 42 and 43. This permits the segments to remain in contact with each other for more positive propagation of the detonation wave along the explosive column and at the same time permits bending of the waterproof cover 38 at the contact points of the explosive segments. The void space between the rounded ends may be filled with an inert liquid or plastic material such as oil or grease or the like, or it may be left open.

In Figure 6 is shown an alternative, preferred embodiment of my invention. The elongated charge is this embodiment is composed of a plurality of sticks 46 joined end to end by coupling members 47 suitably attached, for example, by a wrapping of friction tape 48, to a supporting wire or cable 49. A cup 50 attached to the bottom end of the cable 49 and fitting the lower end of the bottom stick 46 may be rounded or pointed as indicated for greater ease in lowering. At the top end of the charge is a weight 51, attached also to cable 49, to assist in lowering the charge 22 through heavy or viscous shothole fluids or mud.

The individual sticks 46 may be constructed as shown in either Figure 7 or Figure 8, the latter being preferred. In Figure 7 each individual stick 46 is made up of the two segments 23 and 24, respectively of low and high velocity material, and the entire stick is covered by the waterproof covering 38. The high-velocity material at the end of the stick 46 is effective to propagate or to receive the detonation across any small intervening gap to or from an adjacent stick.

Still more reliable detonation is provided by a stick construction as shown in Figure 8, in which the high-velocity material 24 is subdivided into the two segments 24a and 24b placed at each end of the stick 46, the central portion being composed of the low-velocity material 23 in direct and intimate contact with the high velocity segments. The composite stick is surrounded by the waterproof covering 38 in this case also. This configuration of the two explosive materials more positively insures propagation of high-order detonation across any gaps from stick to stick along the column of charge material since high-velocity material is present on both sides of any gap between adjoining sticks, both to transmit and to receive the detonation wave across the gap.

A further embodiment of the invention is shown in Figure 9 which utilizes separate sticks for the low-velocity material 23 and the high-velocity material 24. These are preferably fastened together with couplings 47, as in Figure 6, attached to the cable 49 for lowering into a bore hole. By having alternate sticks of the high-velocity material 24, the high-order detonation wave is propagated along the length of the explosive column much more reliably than if there were only low-velocity material 23 on both sides of any given gap in the train of explosives.

The effectiveness of elongated charges for reducing the generation of undesired waves, such as the secondary waves discussed above, may be better understood upon reference to Figure 10. This figure shows, as a function of detonation velocity, the ratios of downward to upward pressures around an exploding 75-foot charge, as compared with assumed equal upward and downward pressures around a charge of the same explosive weight concentrated within 18 inches of length. The velocity V of the surrounding seismic wave transmitting medium was about 9,400 feet per second. As the curve 55 shows, when the detonation velocity of the charges employed approached this velocity, the pressure ratio increased very rapidly, even considering the compression due to the logarithmic vertical scale employed in this figure, and approached values of nearly 30 at the critical velocity.

Figure 11 shows the approximate relation between the length of the charge and the observed ratio of downward to upward pressures. This relation, for lengths of charge between about 10 and about 100 feet, approximates a straight line of slope ½ on a logarithmic plot, indicating that the pressure ratio varies approximately as the square root of the charge length.

Figure 10 in particular is believed to show that the preferable range of variations, or the permissible mismatch, of detonation velocity is about plus or minus 10% of the formation seismic-wave transmission velocity, although it is apparent that some of the benefits of the velocity matching are retained outside of these limits, particularly on the upper side of the velocity range. In at least one instance studied, secondary reflections did not become noticeable until a mis-match of about 20% of the seismic-wave velocity occurred, but this probably will vary from one locality to another.

It is, in fact, preferable to employ, in charges designed for low velocities, larger amounts of high velocity material than otherwise might be employed in accordance with Equation 1 above, for the reason that the high-velocity segments in the low-velocity column of material act as boosters and aid in maintaining propagation of the desired high-order detonation. We have observed that, without such segments or high-velocity sticks to act as boosters, elongated charges made up solely of sticks of low-velocity explosive very often do not propagate the detonation across the gaps between sticks, especially under moderate hydrostatic pressures.

Although the invention has now been described in detail and several embodiments illustrated, it is apparent that further modifications will occur to those skilled in the art. The invention, therefore, should not be considered as limited to the details described, but its scope is properly to be ascertained from the appended claims.

I claim:

1. Seismic surveying apparatus comprising, in combination, an elongated explosive charge comprising a plurality of segments of explosive material placed end-to-end in a bore hole opposite an earth medium of seismic wave propagation velocity V, alternate segments of said explosive material having a detonation velocity $V_1$ less than V and the remainder of said segments having a detonation velocity $V_2$ greater than V, the ratio of lengths of any two adjacent segments being chosen to provide an average detonation velocity therethrough approximately equal to V, means for initiating detonation of said charge at one end thereof, and means spaced from said charge for receiving and recording the resultant seismic waves after travel through the earth's subsurface.

2. Seismic surveying apparatus comprising, in combination an elongated explosive charge having an average velocity of detonation over the length of the charge substantially matching the seismic wave propagation velocity V of an adjacent earth medium in a bore hole wherein said charge is located, said charge comprising a plurality of cylindrical explosive sticks supported end-to-end and having detonation velocities alternately equal to $V_1$ and $V_2$, where $V_1$ is less and $V_2$ is greater than V, the ratio of length $L_1$ of the explosive sticks having the detonation velocity $V_1$ to the length $L_2$ of explosive sticks having the detonation velocity $V_2$ being given approximately by the equation $$\frac{L_1}{L_2}=\frac{V_1(V_2-V)}{V_2(V-V_1)}$$

means for initiating detonation of said charge at one end thereof, and means spaced from said charge for receiving and recording the resultant seismic waves after travel through the earth's subsurface.

3. Seismic surveying apparatus comprising, in combination, an elongated explosive charge comprising a plurality of cylindrical sticks of explosive placed end-to-end in a bore hole adjacent an earth medium of seismic wave propagation velocity V, each of said sticks containing at least two cylindrical sections of explosive materials of different detonation velocity in end-to-end contact with each other, the ratio of length $L_1$ of the section of explosive of detonation velocity $V_1$ less than V to the length $L_2$ of the section of explosive of detonation velocity $V_2$ greater than V being given approximately by the equation $$\frac{L_1}{L_2} = \frac{V_1(V_2-V)}{V_2(V-V_1)}$$

means for initiating detonation of said charge at one end thereof, and means spaced from said charge for receiving and recording the resultant seismic waves after travel through the earth's subsurface.

4. Seismic surveying apparatus comprising, in combination, an elongated explosive charge in a bore hole opposite an earth medium of seismic wave propagation velocity V, said charge comprising a plurality of sticks and means for holding said sticks substantially in contact end-to-end, each of said sticks being composed of a length $L_1$ of explosive of detonation velocity $V_1$ less than V and a length $L_2$ of explosive of detonation velocity $V_2$ greater than V, the material of detonation velocity $V_2$ being placed at at least one of the ends of said stick, and the ratio of the lengths $L_1$ and $L_2$ being given approximately by the equation $$\frac{L_1}{L_2} = \frac{V_1(V_2-V)}{V_2(V-V_1)}$$

means for initiating detonation of said elongated charge at one end thereof, and means spaced from said charge for receiving and recording the resultant seismic waves after travel through the earth's subsurface.

5. An explosive charge as in claim 4 wherein said material of detonation $V_2$ is divided into two parts, one of said parts being placed at each end of an explosive stick and in intimate contact with the explosive of detonation velocity $V_1$ forming the central portion of said stick.

References Cited in the file of this patent

UNITED STATES PATENTS

| | | |
|---|---|---|
| 193,483 | Castellanos | July 24, 1877 |
| 1,998,412 | Prescott | Apr. 16, 1935 |
| 2,609,885 | Silverman | Sept. 9, 1952 |

FOREIGN PATENTS

| | | |
|---|---|---|
| 633,528 | Great Britain | Dec. 19, 1949 |